(12) United States Patent
Berman et al.

(10) Patent No.: US 7,127,624 B2
(45) Date of Patent: Oct. 24, 2006

(54) ENERGY DETECT WITH AUTO PAIR SELECT

(75) Inventors: Mark Berman, Newport Coast, CA (US); Richard Glen Thousand, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 927 days.

(21) Appl. No.: 09/928,622

(22) Filed: Aug. 13, 2001

(65) Prior Publication Data

Related U.S. Application Data

(63) Continuation-in-part of application No. 09/886,859, filed on Jun. 21, 2001.

(60) Provisional application No. 60/224,846, filed on Aug. 11, 2000, provisional application No. 60/213,140, filed on Jun. 22, 2000.

(51) Int. Cl.
*G06F 5/06* (2006.01)
*G06F 1/12* (2006.01)

(52) U.S. Cl. ............... 713/320; 713/321; 713/322; 713/323; 713/324; 370/241; 370/245; 370/252

(58) Field of Classification Search ........ 713/320–324; 370/252, 241, 245
See application file for complete search history.

(56) References Cited

U.S. PATENT DOCUMENTS

| | | | |
|---|---|---|---|
| 5,577,023 A | 11/1996 | Marum et al. | |
| 5,768,301 A | 6/1998 | Dreyer et al. | |
| 6,026,494 A | 2/2000 | Foster | |
| 6,393,050 B1 * | 5/2002 | Liu | 375/219 |
| 6,442,142 B1 * | 8/2002 | Bar-Niv | 370/252 |
| 6,487,214 B1 * | 11/2002 | Bachar | 370/445 |
| 6,819,760 B1 * | 11/2004 | Nayler | 379/390.01 |
| 6,894,602 B1 * | 5/2005 | Browning | 340/286.02 |
| 2002/0019954 A1 * | 2/2002 | Tran | 713/600 |
| 2005/0128056 A1 * | 6/2005 | Browning | 340/286.02 |

FOREIGN PATENT DOCUMENTS

EP     0573204 A2     2/2000

OTHER PUBLICATIONS

"BXM5411 Ethernet Transceiver", INTERNET, Online! 2001, XP002193684; <http://www.broadcom.com> ; retrieved on Mar. 20, 2002 (the whole document).

* cited by examiner

*Primary Examiner*—A Elamin
(74) *Attorney, Agent, or Firm*—Garlick Harrison & Markison; Shayne X. Short

(57) ABSTRACT

Energy detect with auto pair select. The present invention is operable without 'a priori' knowledge of the pairs' connectivity. In addition, the present invention is operable within systems performing automatic detection of connectivity in systems that employ the Ethernet based media dependent interface crossover (MDIX). Where there has been some cross-over of pairs within the system, a situation not uncommon in many networks, the present invention is operable to perform energy management even without having any knowledge of the pair connectivity. Knowledge relating to the energy of multiple pairs is used to perform energy detect and management. A state machine operates in performing the analysis of the energy using a qualified energy level. The present invention is also operable within systems that do not employ auto-negotiation. In systems where auto-negotiation is performed, the present invention is performed before the auto-negotiation to determine if an operable partner exists within the network.

39 Claims, 8 Drawing Sheets

ENERGY DETECT WITH AUTO PAIR SELECT

CROSS REFERENCE TO RELATED APPLICATIONS

The present U.S. Utility Patent Application is a continuation-in-part (CIP) of the following U.S. Utility Patent Application:

1. U.S. Utility application Ser. No. 09/886,859, entitled "METHOD AND APPARATUS FOR REGULATING TRANSCEIVER POWER CONSUMPTION FOR A TRANSCEIVER IN A COMMUNICATIONS NETWORK," filed Jun. 21, 2001, pending, which claims priority to pursuant to 35 U.S.C. § 119(e) to the following U.S. Provisional Patent Application: U.S. Provisional Application Ser. No. 60/213,140, entitled "REGULATING TRANSCEIVER POWER CONSUMPTION FOR A TRANSCEIVER IN A COMMUNICATIONS NETWORK," filed Jun. 22, 2000, pending.

The present U.S. Utility Patent Application also claims priority pursuant to 35 U.S.C. § 119(e) to the following U.S. Provisional Patent Application which is hereby incorporated herein by reference in its entirety and made part of the present U.S. Utility Patent Application for all purposes:

1. U.S. Provisional Application Ser. No. 60/224,846, entitled "ENERGY DETECT WITH AUTO PAIR SELECT," filed Aug. 11, 2000, pending.

BACKGROUND

1. Technical Field

The invention relates generally to energy detect and auto power down devices; and, more particularly, it relates to a system and method operable to perform energy detection and auto pair selection within a device that is operable to perform power savings.

2. Related Art

Prior art energy detection systems depend intrinsically upon a priori knowledge of the connectivity of wires, and pairs of wires, within their respective systems to perform energy savings. That is to say, a definitive knowledge of the connectivity to the system is required to perform proper power savings functionality. The operation of such systems becomes increasingly difficult when the wires have been improperly connected. In come cases, the system will fail to function at all. That is to say, when there is no knowledge of the connectivity, there is an inability within the system to perform proper power management.

Traditionally, networks were often designed to include a hub and a number of devices connected to the hub. In this situation, there is no problem with connectivity of pairs of wires, as the hub performs the change over of the pairs within the hub itself. However, as network topologies have grown to include a number of devices besides this traditional hub and spoke type of interconnection, then device-device connectivity (where neither of the devices are hubs) can be problematic to the operation of the energy and power management system. Oftentimes a cross-over connection is inserted, for example in the case of Ethernet, to accommodate the fact that the send and receive paths differ in this context compared to a device-hub connection context.

Further limitations and disadvantages of conventional and traditional systems will become apparent to one of skill in the art through comparison of such systems with the invention as set forth in the remainder of the present application with reference to the drawings.

BRIEF SUMMARY OF THE INVENTION

The present invention provides, for the first time, a solution that is operable in conjunction with automatic media dependent interface crossover (MDIX). Auto MDIX is commonly referred to in Ethernet related technology. Prior art technologies inherently relied upon definitive knowledge about which wire pair is the receive pair in order to perform proper energy management. The present invention significantly increases the usefulness of an auto power down circuitry, as it may now be used in conjunction with auto MDIX.

Single wire, wire pair, and other connectivity schemes may all benefit from various aspects of the present invention. As link pulses are sent along wires, to determine connectivity within the system, the energy associated with the link pulse is suppressed in performing auto power down operation and energy management.

The present invention is operable to perform proper function of any energy detect and power down circuitry without having any knowledge of which pair is the transmit pair and which pair is the receive pair. From certain perspectives, the present invention considers energy detection information from both the transmit and receive wire pairs. Then, the present invention is operable to determine the presence of a link partner regardless of whether the wiring was installed properly or not.

Part of an auto power down method, performed in accordance with certain aspects of the present invention, involves periodically transmitting link pulses on one of the transceiver's wire pairs in order to potentially awaken the link partner. This operation may be performed sequentially across a number of the wire pairs as well. Then, an auto power down select circuitry is operable to cease monitoring of the wire pair on which the link pulses are sent; this is to ensure that a false detection of energy is not made by the device's own generated link pulse. From certain perspectives, the energy that is associated with link pulse that is transmitted may be subtracted, actually or logically, from the circuitry that performs the energy management. Various embodiments are described below that perform the proper handling operation of the energy that is associated with a transmitted link pulse on one or more wire pairs.

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

A better understanding of the invention can be obtained when the following detailed description of various exemplary embodiments is considered in conjunction with the following drawings.

DETAILED DESCRIPTION OF THE INVENTION

Figure 1:
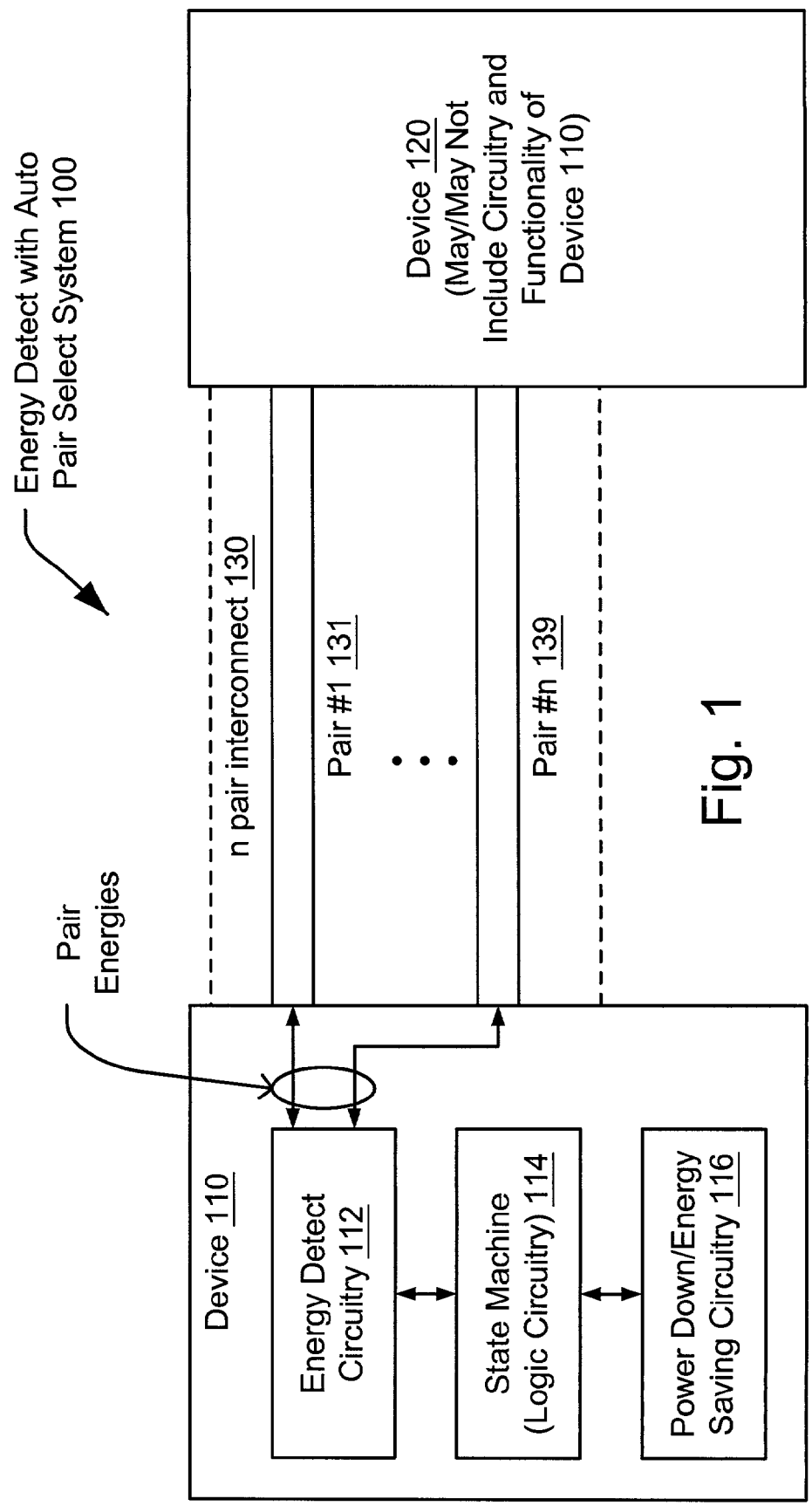
FIG. 1 is a system diagram illustrating an embodiment of an energy detect with auto pair select system that is built in accordance with certain aspects of the present invention.

In various embodiments of the present invention, the terminology of pairs is used. Those persons having skill in the art will appreciate that single wire connectivity is also included within the scope and spirit of the invention. The pair embodiment will be understood by those persons having skill in the art, given the large number of commercial types of wires that employ pair wires, twisted pairs, and so on. However, the present invention is also operable within embodiments that employ single wire connectivity throughout.

An energy detect circuitry, that is operable to perform auto power down, monitors an attached wire. This energy detect circuitry determines if any incoming signal, or any energy, is present on the wire that will signal that a link partner is attached to the other end of the wire. When there is no wire attached to the other end, or no link partner attached to the other end of a wire connected to a device, then no energy will be present on the wire, and the energy detect circuitry (the detector) will indicate this condition. A state machine, that is also described in various embodiments, is operable to recognize various forms of transmission. One application area is the Ethernet context. The state machine can specifically recognize 10Base-T link pulses, 10Base-T packets, 100Base-T link, and auto-negotiation link pulse bursts.

The present invention is at least one operable within systems that employ Ethernet based media dependent interface crossover (MDIX). Previous systems experienced difficulty when this additional functionality was introduced. An auto MDIX solution automatically compensated for any improperly installed cable pair(s). The auto MDIX solution is introduced to allow proper functionality even when cable has not been installed properly, and there is the undesirable crossover of wires. Ethernet employs certain conventions to ensure that the receive and transmit wire pair(s) are not swapped when the cable is installed in a particular site. Prior art energy detect/power down circuitry relied solely upon energy being detected on the receive wire pair(s). The auto MDIX functionality is implemented into a number of transceivers. The present invention performs an elegant modification to ensure proper functionality of any energy detect/power down circuitry even when auto MDIX is implemented.

From certain perspectives, a new element is added to a transceiver-operable device. The device may be a chip, a board having discrete components or chip-sets, or any other device having logic and operational configure-ability. The present invention is adaptable within BCM5411 and BCM5421 transceiver chips designed by Broadcom Corporation. The present invention is operable to perform proper function of any energy detect and power down circuitry without having any knowledge of which pair is the transmit pair and which pair is the receive pair. From certain perspectives, the present invention considers energy detection information from both the transmit and receive wire pairs. Then, the present invention is operable to determine the presence of a link partner regardless of whether the wiring was installed properly or not.

This new element, added to the transceiver-operable device, is sometimes referred to an energy detect with auto pair select. When a transceiver is trying to determine if there is a link partner attached, then the present invention is operable to perform monitoring of all of the wire pairs that are connected to the transceiver. This is particularly helpful when auto MDIX is employed, and there is no knowledge of the connectivity of the pairs. Here, with no knowledge of which is the transmit pair and which is the receive pair, then the present invention is operable to monitor both pairs.

Part of an auto power down method, performed in accordance with certain aspects of the present invention, involves periodically transmitting link pulses on one of the transceiver's wire pairs in order to potentially awaken the link partner. This operation may be performed sequentially across a number of the wire pairs as well. Then, an auto power down select circuitry is operable to cease monitoring of the wire pair on which the link pulses are sent; this is to ensure that a false detection of energy is not made by the device's own generated link pulse. From certain perspectives, the energy that is associated with a link pulse that is transmitted may be subtracted, actually or logically, from the circuitry that performs the energy management. Various embodiments are described below that perform the proper handling operation of the energy that is associated with a transmitted link pulse on one or more wire pairs.

The present invention provides, for the first time, a solution that is operable in conjunction with auto MDIX. Prior art technologies inherently relied upon definitive knowledge about which wire pair is the receive pair in order to perform proper energy management. The present invention significantly increases the usefulness of an auto power down circuitry, as it may now be used in conjunction with auto MDIX.

FIG. 1 is a system diagram illustrating an embodiment of an energy detect with auto pair select system 100 that is built in accordance with certain aspects of the present invention. A device 110 and a device 120 are communicatively coupled via an n pair interconnect 130. The n pair interconnect 130 includes an indefinite number of pairs shown as a pair #1 131, . . . , and a pair #n 139. The device 110 includes an energy detect circuitry 112, a state machine (logic circuitry) 114 and a power down/energy saving circuitry 116. The functionality offered by the power down/energy saving circuitry 116 is sometimes referred to as auto power down functionality in various embodiments. The pair energies of at least one of the pairs within the n pair interconnect 130 is provided to the energy detect circuitry 112. Then, based on the energy information of the pairs that are provided to the energy detect circuitry 112, the state machine 114 identifies the connectivity of the devices that are connected to the device 110. When no device is connected to the device 110, the power down/energy saving circuitry 116 is operable to perform the auto powering down of the device 110 to conserve energy.

The device 120 need not necessarily have the same circuitry and need not necessarily be operable to perform the same functionality as the device 110. That is to say, even if the device 120 is not able to perform such energy savings/energy power down functionality, it will not impede such functionality on the device 110. Certain aspects of the present invention are operable to be backward compatible, from certain perspectives, into systems that have a number of devices that are incapable of performing the energy detect with auto pair select functionality. In addition, devices within the network may also be upgraded to include the functionality offered by certain aspects of the present invention without entering any deleterious effects into other of the devices within the network.

Figure 2:
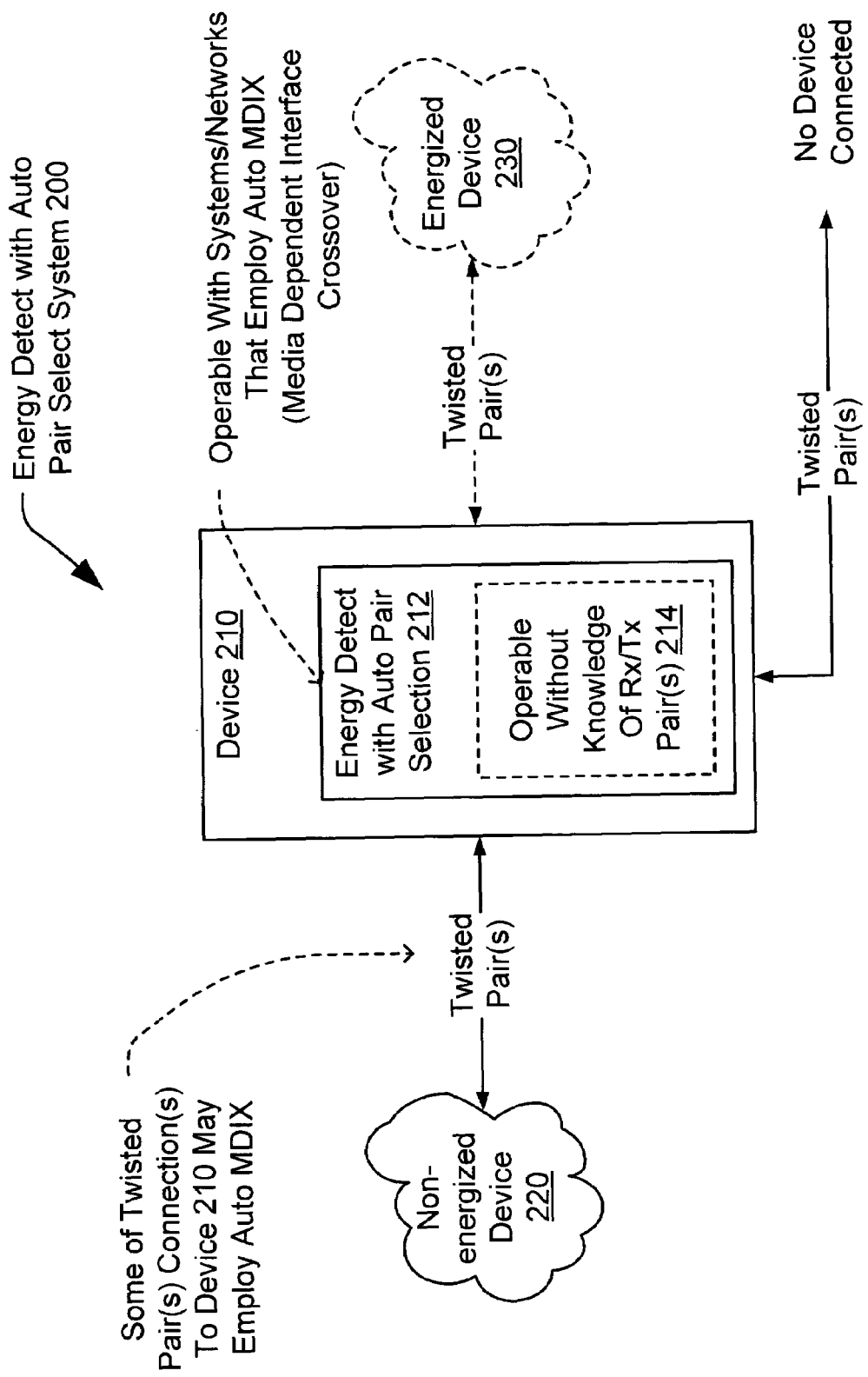
FIG. 2 is a system diagram illustrating another embodiment of an energy detect with auto pair select system that is built in accordance with certain aspects of the present invention.

FIG. 2 is a system diagram illustrating another embodiment of an energy detect with auto pair select system 200 that is built in accordance with certain aspects of the present invention. A device 210 is operable to perform the functionality of energy detect with auto pair selection 212. The present invention is capable to perform this functionality without requiring any 'a priori' knowledge of the receive and transmit pairs 214.

For example, the device 210 is operable when connected to one or more of a nonenergized device 220, to an energized device 230, or even when there is a pair that is connected to no device at all. The pairs are shown as twisted pairs in this illustration. If desired, auto MDIX functionality may be performed along one or more of the pairs communicatively coupled to the device 210. In addition, one or more of the device to which the device 210 is communicatively coupled may also perform auto MDIX.

When the device 210 is communicatively coupled to an energized device, such as the energized device 230, then the device 210 will recognize this and will remain powered up for full operation. Then, if the energized device 230 ever becomes non-energized, the device 210 will recognize this event and will move into an auto power down sequence. There may also be situations where a pair is connected to the device 210, but no other device is communicatively coupled to the other end of the pair. Here, the device 210 will be operable to determine that no other device is there, and will perform auto power down functionality thereafter.

It is also noted that the present invention is operable to perform within systems and networks where other of the devices within these networks and systems may or may not employ auto MDIX functionality. As mentioned above, the present invention offers a degree of backward compatibility here.

Figure 3:
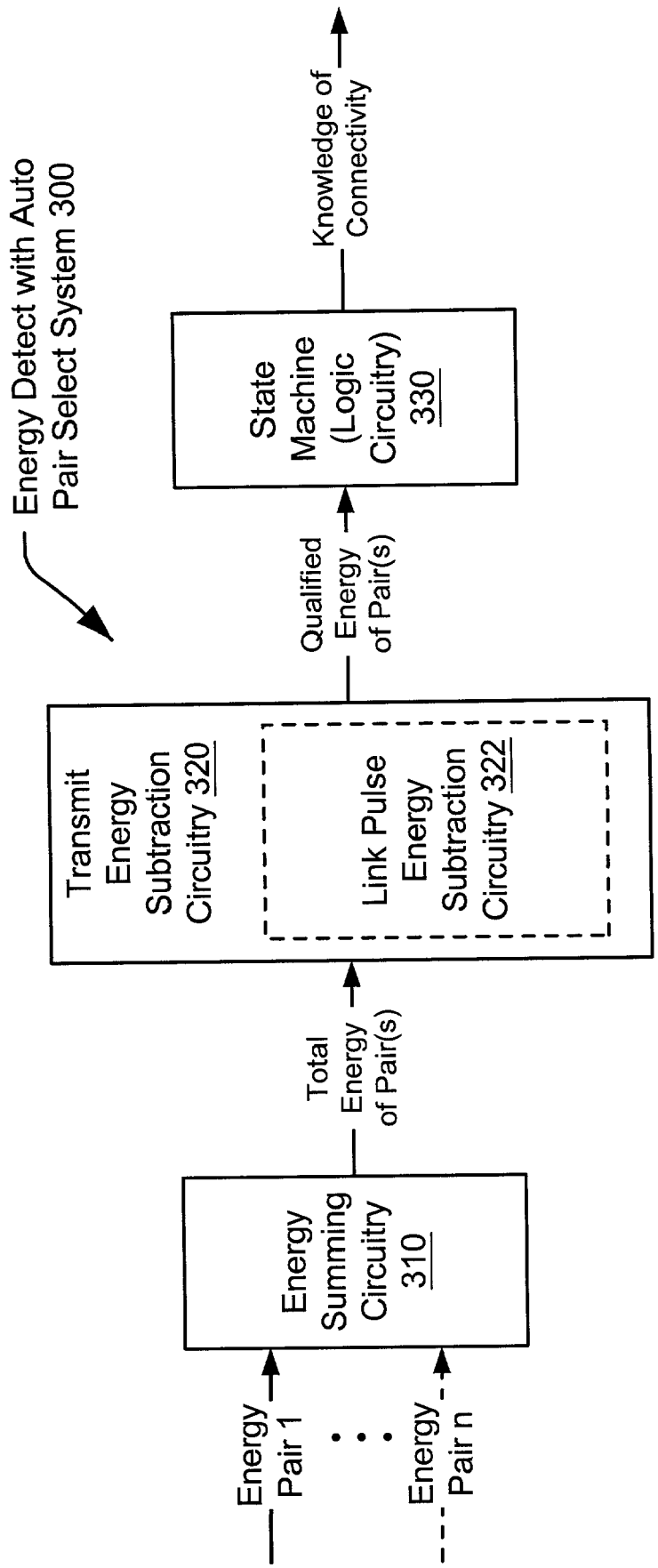
FIG. 3 is a system diagram illustrating another embodiment of an energy detect with auto pair select system that is built in accordance with certain aspects of the present invention.

FIG. 3 is a system diagram illustrating another embodiment of an energy detect with auto pair select system 300 that is built in accordance with certain aspects of the present invention. The energy of an indefinite number of pairs, shown as energy pair 1, . . . , and energy pair n is fed to an energy summing circuitry 310. From the energy summing circuitry 310, a total energy of the pair(s) is provided to a transmit energy subtraction circuitry 320. It is noted that the present invention is operable to perform this functionality within systems where only a single wire pair is used, as well as an indefinite number of wire pairs as well. Here, in the energy subtraction circuitry 320, a link pulse energy subtraction circuitry 322 subtracts the transmitted link energy. A qualified energy of the pair(s) is provided from the energy subtraction circuitry 320 to a state machine (logic circuitry) 330. The state machine (logic circuitry) 330 determines knowledge of the connectivity of the system.

Figure 4:
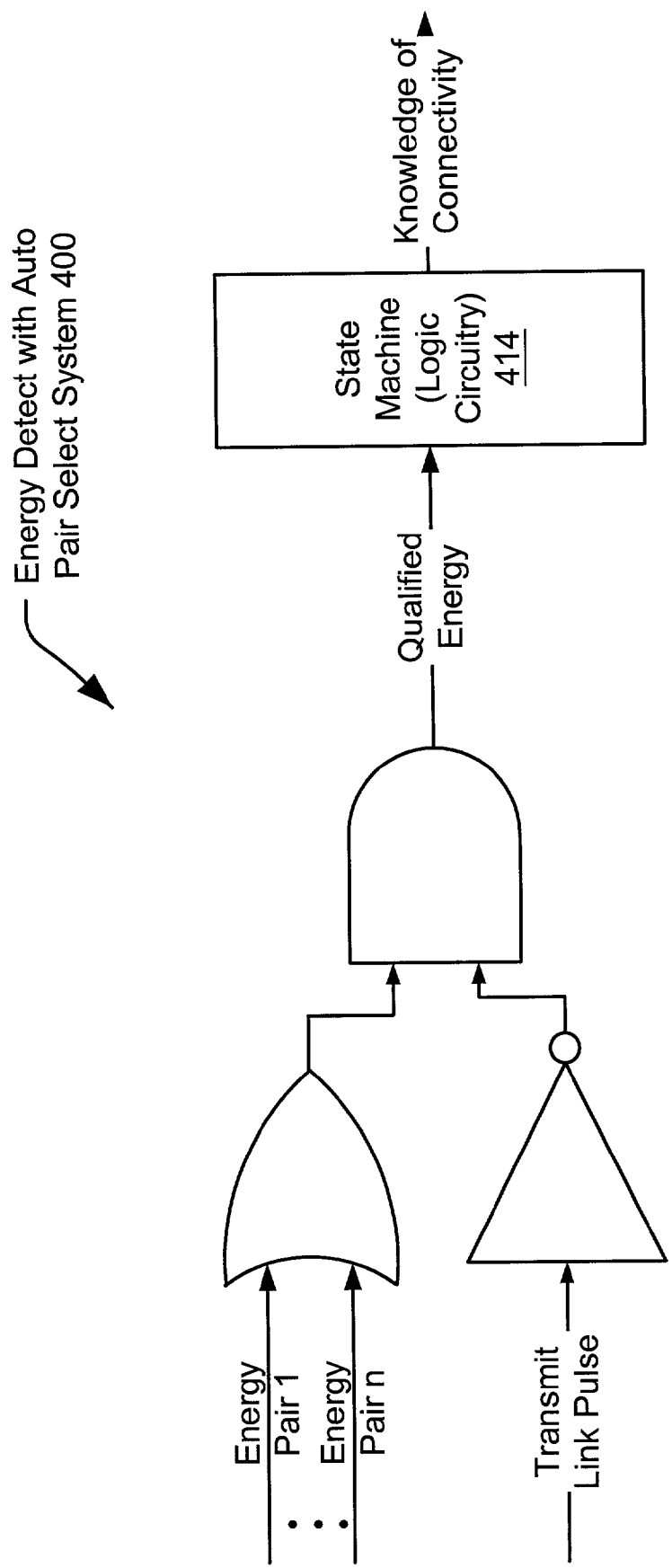
FIG. 4 is a system diagram illustrating another embodiment of an energy detect with auto pair select system that is built in accordance with certain aspects of the present invention.

FIG. 4 is a system diagram illustrating another embodiment of an energy detect with auto pair select system 400 that is built in accordance with certain aspects of the present invention. The raw energy signals, that may be produced by sets of comparators in an analog front end of a transceiver, are first combined together using an OR gate. Any number of energy pairs may be combined in the OR gate. Then, the output of the OR gate is fed to an AND gate, where it is combined with a logical signal associated with the energy being transmitted via a link pulse. The result is such that it is suppressed during and some period after the transceiver transmits a link pulse. A qualified energy signal is then fed to a remaining portion of the auto power down circuitry. A state machine 414, employing logic circuitry, is operable to provide information regarding the connectivity of the system.

Figure 5:
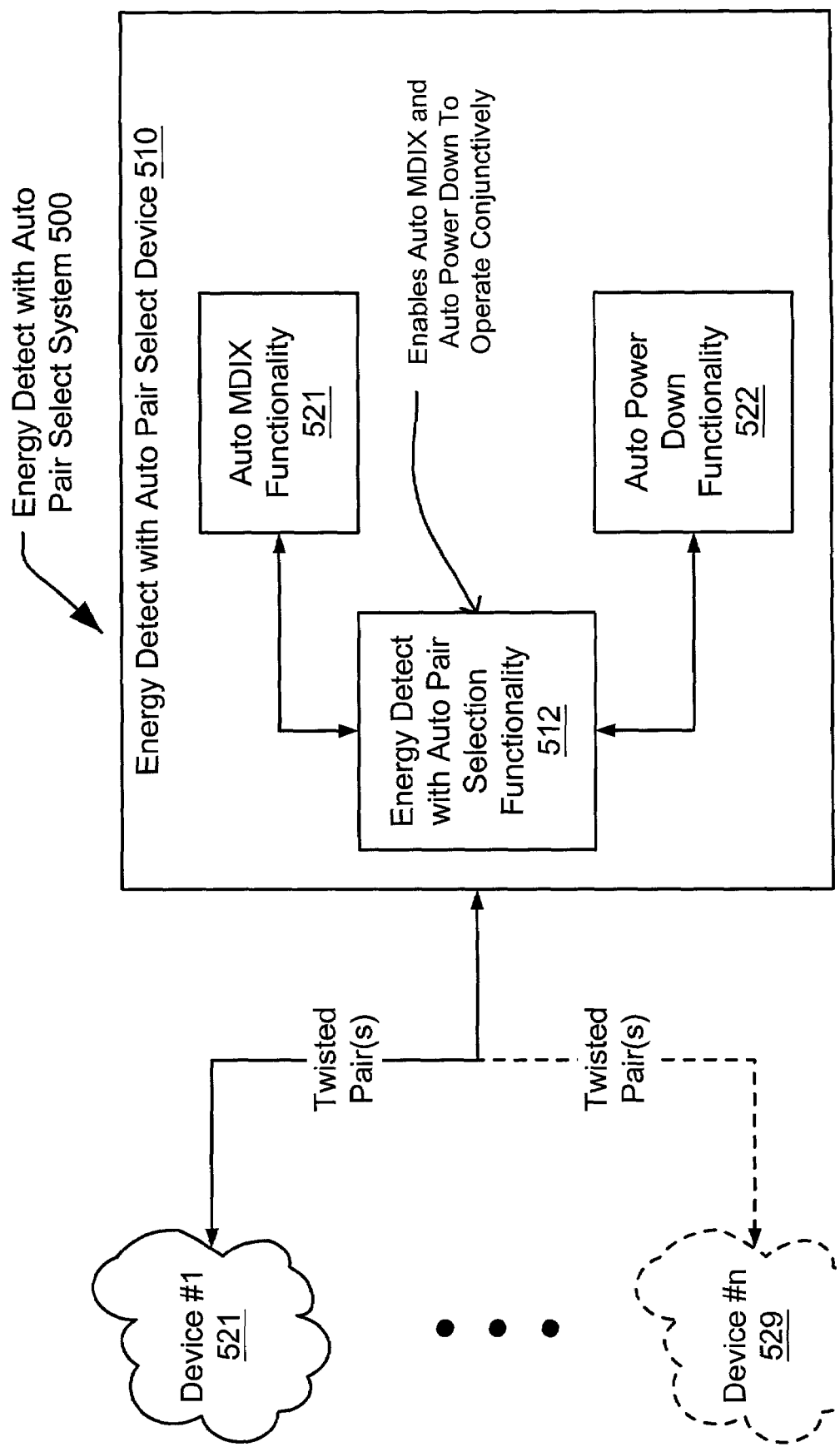
FIG. 5 is a system diagram illustrating another embodiment of an energy detect with auto pair select system that is built in accordance with certain aspects of the present invention.

FIG. 5 is a system diagram illustrating another embodiment of an energy detect with auto pair select system 500 that is built in accordance with certain aspects of the present invention. An energy detect with auto pair select device 510 is communicatively coupled to any number of other devices via twisted pair(s). The other devices are shown as device #1 521, . . . , and device #n 529. The energy detect with auto pair select device 510 is operable to perform energy detect with auto pair select functionality 512, as well as auto MDIX functionality 521, and auto power down functionality 522. The energy detect with auto pair select functionality 512 enables the energy detect with auto pair select device 510 to perform the auto MDIX functionality 521 and the auto power down functionality 522 to operate in conjunction. Within prior art systems, any auto MDIX functionality necessitated definitive knowledge of the connectivity of the wire pairs. Here, the energy detect with auto pair select functionality 512, as offered by the present invention, enables the proper functionality of the system.

Figure 6:
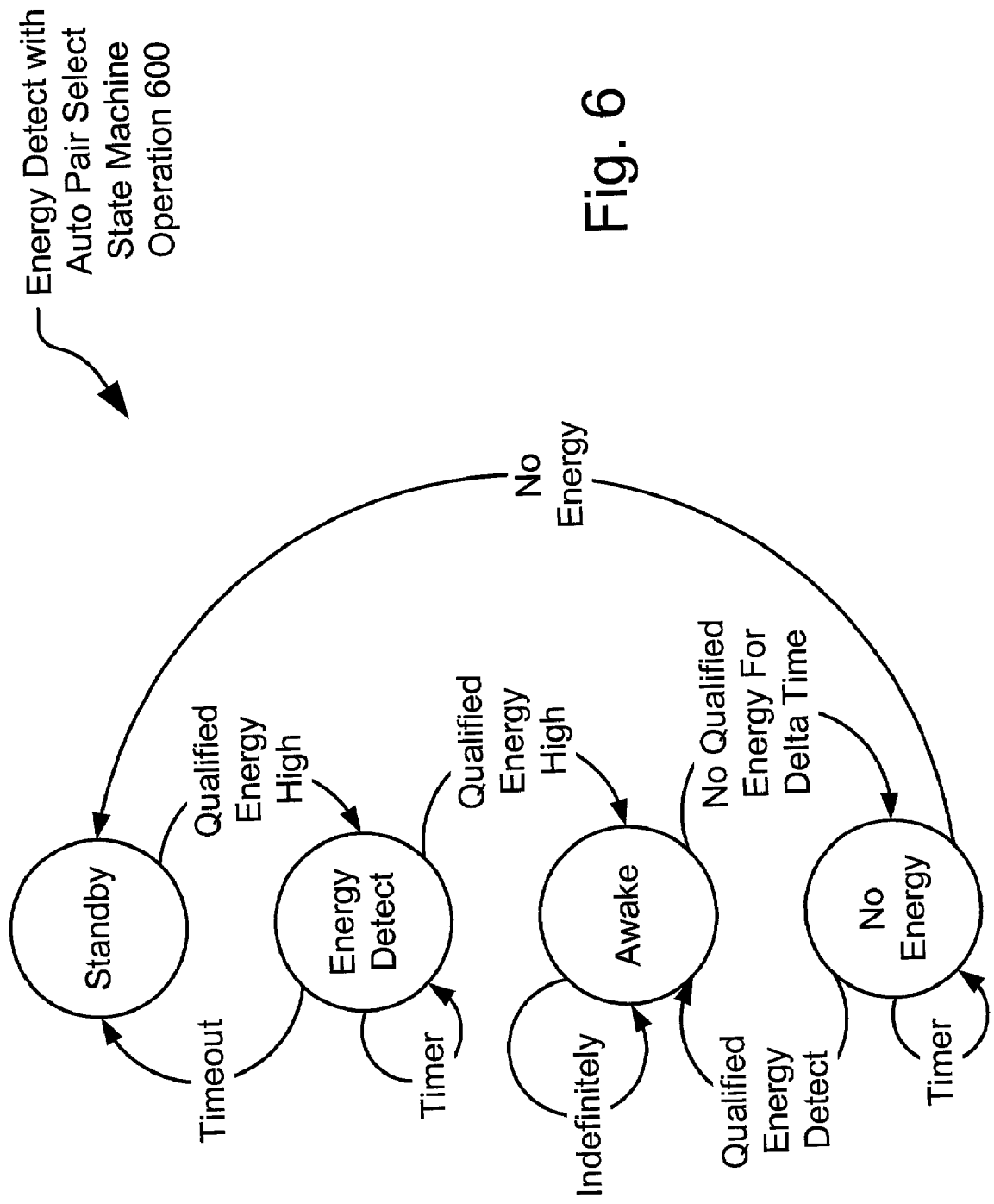
FIG. 6 is a state diagram illustrating an embodiment of operation of an energy detect with auto pair select state machine that is performed in accordance with certain aspects of the present invention.

FIG. 6 is a state diagram illustrating an embodiment of operation of an energy detect with auto pair select state machine 600 that is performed in accordance with certain aspects of the present invention. A device that operates using the energy detect with auto pair select state machine 600 may begin initially in a standby state or in an awake state. For illustration, the situation where the device is in the standby state is used.

When the device is in the standby state, the device waits until a qualified energy has been detected. As described above, the qualified energy includes suppressing the energy associated with a transmitted link pulse. After the qualified energy has been detected, then the state of the energy detect with auto pair select state machine 600 moves to an energy detect state. Then, the energy detect with auto pair select state machine 600 waits a period of time, shown as timeout. This timeout period may be programmed, predetermined, or adaptive based on the operation of the device and the network in which the device is installed. If no more energy is received during the timeout period, then the state of the energy detect with auto pair select state machine 600 reverts back to the standby state.

However, if energy is received and the qualified energy is still high after that timeout period, then the state of the energy detect with auto pair select state machine 600 waits a period of time shown as timer to ensure that the qualified energy is at a high level. This again, of course, involves suppressing the energy associated with any transmitted link pulse during evaluation of the qualified energy. If the qualified energy is still high indicating that link pulses are still coming in, then the state of the energy detect with auto pair select state machine 600 changes to an awake state. Here, the device that employs the energy detect with auto pair select state machine 600 will remain indefinitely until there is some indication that a link to another active device is lost. For example, when it is detected that there is no more qualified energy for a period of time (delta time), then the state of the energy detect with auto pair select state machine 600 will move to a no energy state for the length of period of a timer. The timer length here may be different from the timer length associated with the energy detect state. Again, the length of this timer may be programmed, predetermined, or adaptive. This timer period may be 2–4 micro-seconds in one embodiment. Then, if the timer has passed indicating that there is no qualified energy, the state of the energy detect with auto pair select state machine 600 will pass back to the standby state, thereby permitting energy savings once again.

One differentiating factor of the present invention, among others, when compared to any prior art system is the ability to utilize both transmit and receive pairs of a transceiver to be provided as inputs to a state machine such as the energy detect with auto pair select state machine 600.

Any of the values of timeout, timers, and other parameters within the operation of the energy detect with auto pair select state machine 600 may be programmed, predetermined, or adaptive. Those persons having skill in the art will appreciate that the particular values used for these types of operational parameters may be altered without departing from the scope and spirit of the invention.

Figure 7:
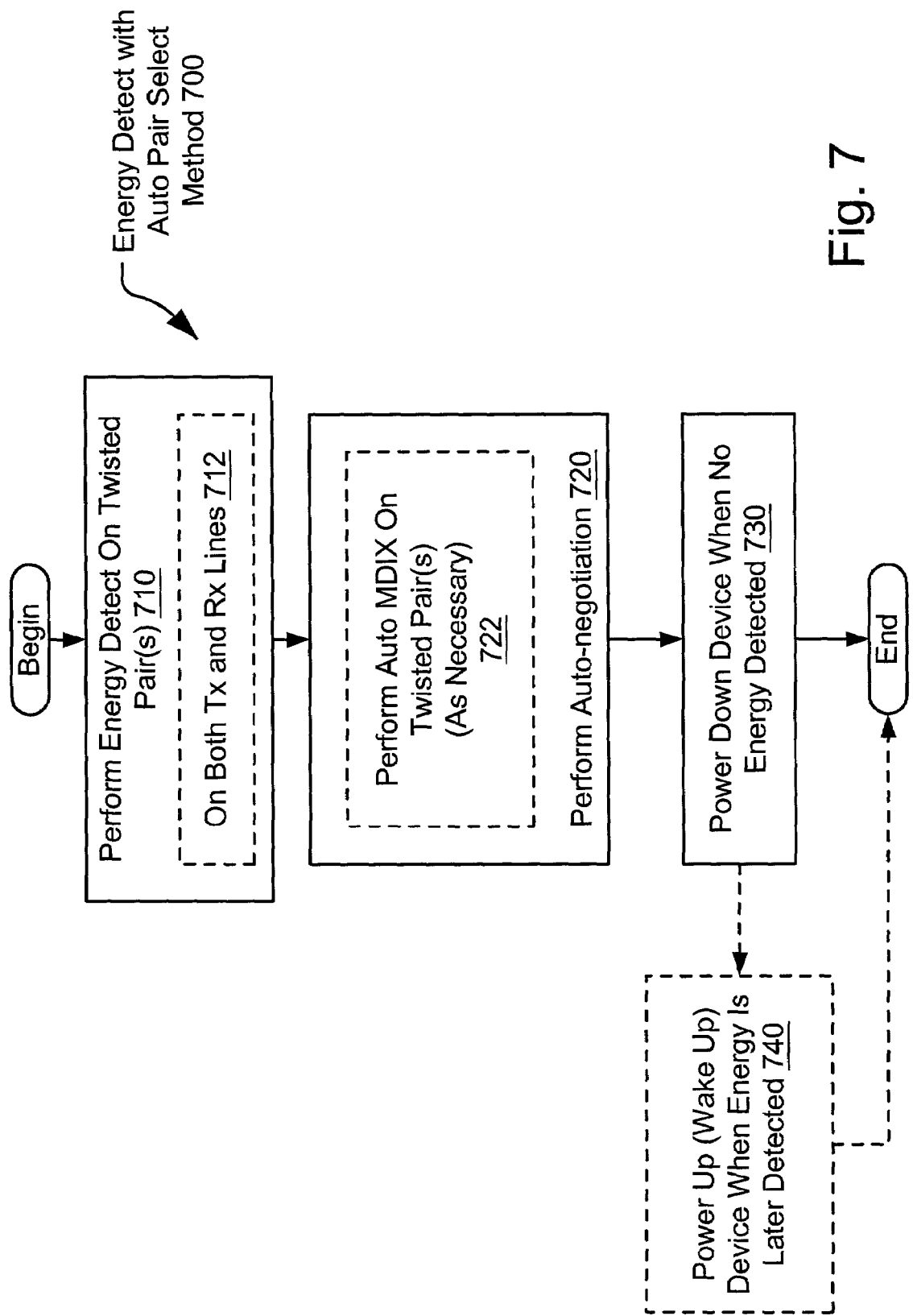
FIG. 7 is a functional block diagram illustrating an embodiment of an energy detect with auto pair select method that is performed in accordance with certain aspects of the present invention.

FIG. 7 is a functional block diagram illustrating an embodiment of an energy detect with auto pair select method 700 that is performed in accordance with certain aspects of the present invention. In a block 710, energy detect is performed on one or more twisted pairs. This may involve performing energy detect on both the transmit and receive wire pairs, as shown in a block 712. Then, in a block 720, auto negotiation is performed. Auto negotiation is understood by those persons having skill in the art, and it involves sending and receiving link pulses to determine the capability of other devices in a network that are interconnected. For example, there is a handshaking procedure in which the various devices may agree on a data communication rate at which both or more devices are capable of communicating with each other. The period associated with auto negotiation is commonly on the order of several micro-seconds. It is noted that the energy detect with auto pair select, as described and performed in various embodiments, may be performed before the auto negotiation procedure, as it is important to determine at that time if there is in fact a partner to communicate with. During the operation within the block 720, auto MDIX may be performed on one or more twisted pairs, as necessary, as shown in a block 722.

Subsequently, in a block 730, the device is powered down when there is no energy detected. When appropriate, this energy is a qualified energy, accounting for and suppressing the energy that is associated with any transmitted link pulses. In addition and alternatively, in a block 740, the device is subsequently awakened (powered up) when energy is later detected.

From certain perspectives, certain aspects of the energy detect with auto pair select method 700 may be performed and described by the operation of a state machine that implements and performs the method described within the FIG. 7.

Figure 8:
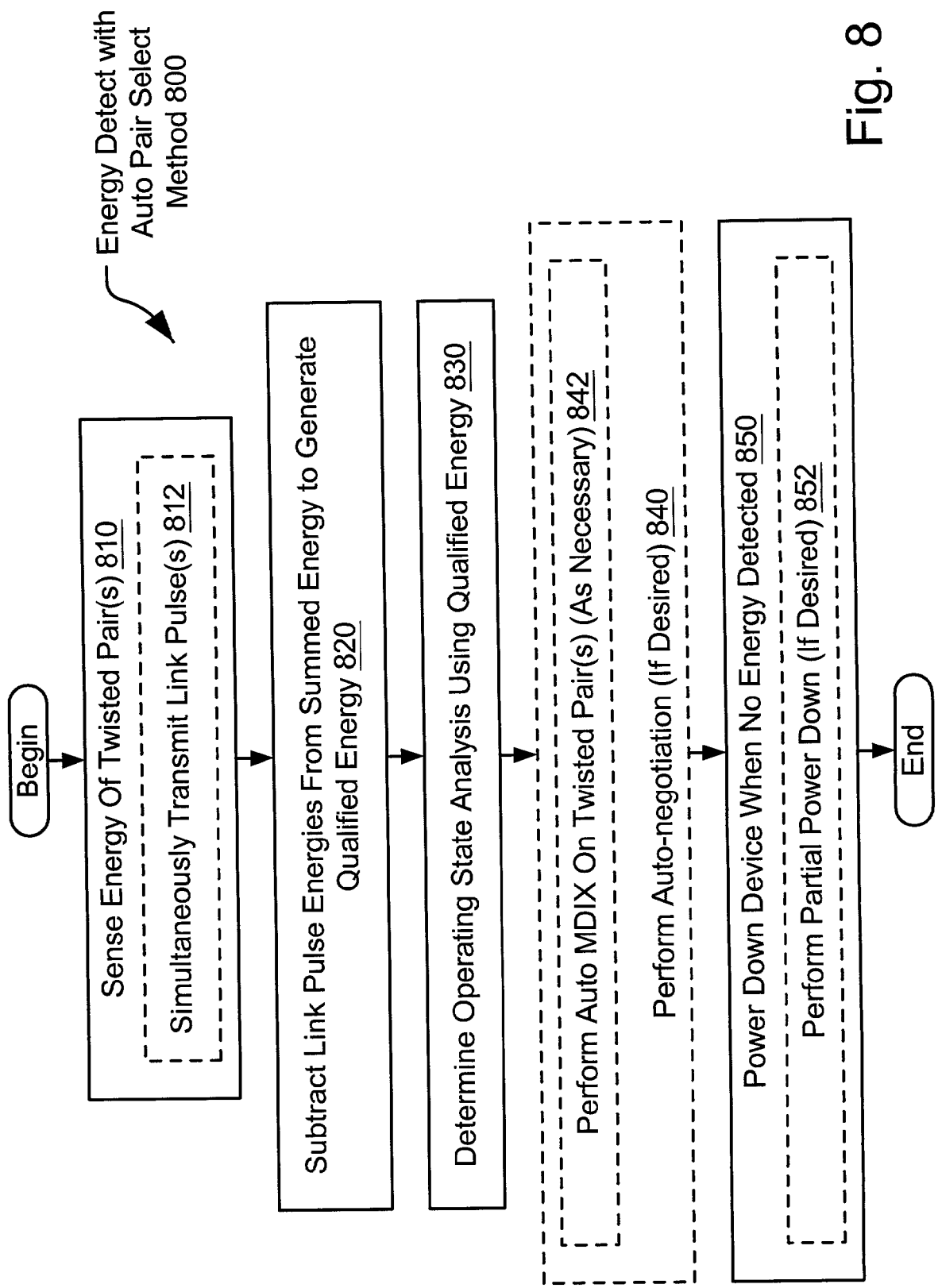
FIG. 8 is a functional block diagram illustrating another embodiment of an energy detect with auto pair select method that is performed in accordance with certain aspects of the present invention.

FIG. 8 is a functional block diagram illustrating another embodiment of an energy detect with auto pair select method 800 that is performed in accordance with certain aspects of the present invention. In a block 810, energy is sensed on one or more twisted pairs. If desired, link pulses are simultaneously transmitted as shown in a block 812. Then, in a block 820, the transmit link pulse energies are subtracted from the summed energy to generate a qualified energy. This is performed when a link pulse is sent, regardless of whether or not a valid link has already been achieved. In this situation, the sensed energy is transformed into a qualified energy where the energy associated with the transmitted link pulse is suppressed. This suppression may be performed logically or actually, in various embodiments without departing from the scope and spirit of the invention.

Subsequently, in a block 830, the analysis of the operating state is determined using the qualified energy. In a block 840, after there is knowledge of the connectivity and state of operation of the device (knowledge of any other link partner), auto negotiation can be performed if desired. Auto MDIX may be performed on one or more twisted pair groups during auto negotiation, as necessary. Ultimately, the device is powered down when there is no qualified energy detected, as shown in a block 850. Alternatively, a partial power down may be performed on the device where some, but not all, of the functional components of the device are powered down to achieve power savings as shown in a block 852.

In view of the above detailed description of the invention and associated drawings, other modifications and variations will now become apparent to those skilled in the art. It should also be apparent that such other modifications and variations may be effected without departing from the spirit and scope of the invention.

What is claimed is:

1. An energy detect with auto pair select system, comprising:
    a device that is operable to perform energy detection with auto pair selection;
    a plurality of wire pairs that is communicatively coupled to the device; and
    wherein the device generates a qualified energy by considering an energy associated with at least two wire pairs within the plurality of wire pairs and subtracts a link pulse energy from the energy when the device transmits a link pulse to generate the qualified energy, the link pulse energy is associated with the link pulse that is transmitted from the device;
    the device uses the qualified energy to determine whether at least one additional device is communicatively coupled to the device via at least one wire pair within the plurality of wire pairs; and
    the device performs auto power down when no device is communicatively coupled to the device via the at least one wire pair; and
    an OR gate that sums energies on each of the plurality of wire pairs; and
    an AND gate that suppresses the link pulse energy from the sum of the energies of each of the plurality of wire pairs.

2. The energy detect with auto pair select system of claim 1, wherein the auto power down comprises a partial auto power down.

3. The energy detect with auto pair select system of claim 1, wherein the device performs auto media dependent interface crossover functionality when the at least one wire pair is transposed with at least one additional wire pair.

4. The energy detect with auto pair select system of claim 1, wherein the device uses the energy associated with the at least two wire pairs within the plurality of wire pairs as the qualified energy when the device does not transmit the link pulse.

5. The energy detect with auto pair select system of claim 1, wherein the plurality of wire pairs comprises at least one of a receive wire pair and a transmit wire pair.

6. The energy detect with auto pair select system of claim 1, further comprising a state machine that is operable to determine connectivity of the device with the plurality of wire pairs.

7. The energy detect with auto pair select system of claim 6, wherein the state machine is operable to change an operational state of the device based on whether at least one additional device is communicatively coupled to the device via at least one wire pair within the plurality of wire pairs.

8. The energy detect with auto pair select system of claim 1, wherein the device performs wake up from a standby state when the device determines that the at least one additional device is communicatively coupled to the device via the at least one wire pair.

9. An energy detect with auto pair select system, comprising:
a device that is operable to perform energy detection with auto pair selection;
a wire pair that is communicatively coupled to the device, wherein the wire pair includes at least one of a transmit pair and a receive pair, and
wherein the device determines whether the wire pair comprises an energy;
the device subtracts a link pulse energy from the energy when the device transmits a link pulse to generate a qualified energy, the link pulse energy is associated with a link pulse that is transmitted from the device;
the device uses the energy as the qualified energy when the device does not transmit a link pulse;
the device uses the qualified energy to determine whether at least one additional device is communicatively coupled to the device via the wire pair;
at least one additional wire pair, which includes at least one of a transmit pair and a receive pair; and
wherein the device sums energy on the wire pair and energy on the at least one additional wire pair.

10. The energy detect with auto pair select system of claim 9, wherein the device performs auto media dependent interface crossover functionality when the wire pair is transposed with at least one additional wire pair.

11. The energy detect with auto pair select system of claim 10, wherein the device performs the auto media dependent interface after determining whether the at least one additional device is communicatively coupled to the device via the wire pair.

12. The energy detect with auto pair select system of claim 9, wherein the device performs auto power down when no device is communicatively coupled to the device via the wire pair.

13. The energy detect with auto pair select system of claim 12, wherein the auto power down comprises a partial auto power down.

14. The energy detect with auto pair select system of claim 9, wherein the device performs wake up from a standby state when the device determines that the at least one additional device is communicatively coupled to the device via the wire pair.

15. The energy detect with auto pair select system of claim 9, wherein the device comprises a state machine that is operable to change an operational state of the device based on whether the at least one additional device is communicatively coupled to the device via the wire pair.

16. An energy detect with auto pair select system, comprising:
a device that is operable to perform energy detection with auto pair selection;
a plurality of wire pairs that is communicatively coupled to the device;
a state machine that is operable to determine connectivity of the device; and
wherein the device performs auto media dependent interface crossover functionality when at least two wire pairs within the plurality of wire pairs are transposed;
the device determines whether at least one wire pair within the wire pair comprises an energy;
the device subtracts a link pulse energy from the energy, when the device transmits a link pulse, to generate a qualified energy, the link pulse energy is associated with a link pulse that is transmitted from the device;
the device uses the energy as the qualified energy when the device does not transmit a link pulse;
the device provides the qualified energy to the state machine;
the state machine determine whether at least one additional device is communicatively coupled to the device via the at least one wire pair; and
the device performs energy savings management.

17. The energy detect with auto pair select system of claim 16, wherein the state machine is contained within the device.

18. The energy detect with auto pair select system of claim 16, wherein the device is operable within at least one of a standby state and an awake state as determined by the state machine.

19. The energy detect with auto pair select system of claim 16, wherein the device performs auto power down when the device determines that no device is communicatively coupled to the device via the wire pair.

20. The energy detect with auto pair select system of claim 16, further comprising an OR gate that sums energies on each of the plurality of wire pairs; and
an AND gate that suppresses the link pulse energy from the sum of the energies of each of the plurality of wire pairs.

21. An energy detect with auto pair select method, the method comprising:
performing energy detection of a plurality of wire pairs, at least one wire pair within the plurality of wire pairs is communicatively coupled to a device;
generating a qualified energy by considering an energy associated with at least two wire pairs within the plurality of wire pairs;
determining whether at least one additional device is communicatively coupled to the device via at least one wire pair within the plurality of wire pairs;
performing auto power down when no device is communicatively coupled to the device via the wire pair; and
performing auto media dependent interface crossover functionality when the wire pair is transposed with at least one additional wire pair.

22. The method of claim 21, further comprising performing auto negotiation between the device and at least one additional device.

23. The method of claim 21, further comprising waking up the device from a standby state.

24. The method of claim 21, wherein the auto power down comprises a partial auto power down.

25. The method of claim 21, further comprising summing energies on each of the plurality of wire pairs; and suppressing energy associated with a transmitted link pulse from the sum of the energies of each of the plurality of wire pairs, the transmitted link pulse being transmitted from a device.

26. The method of claim 21, further comprising using the energy of at least one wire pair within the plurality of wire pairs as the qualified energy when the device does not transmit a link pulse.

27. The method of claim 21, wherein the plurality of wire pairs comprises at least one of a receive wire pair and a transmit wire pair.

28. The method of claim 21, further comprising employing a state machine to determine connectivity of the device with the plurality of wire pairs.

29. The method of claim 28, wherein the state machine is operable to change an operational state of the device based on whether at least one additional device is communicatively coupled to the device via at least one wire pair within the plurality of wire pairs.

30. The method of claim 21, wherein the device performs wake up from a standby state when the device determines that the at least one additional device is communicatively coupled to the device via the wire pair.

31. An energy detect with auto pair select method, the method comprising:

performing energy detection with auto pair selection on a device having a wire pair communicatively coupled thereto;

determining whether the wire pair comprises an energy;

subtracting a link pulse energy from the energy, when the device transmits a link pulse, to generate a qualified energy, the link pulse energy is associated with a link pulse that is transmitted from the device;

using the energy as the qualified energy when the device does not transmit a link pulse; and using the qualified energy to determine whether at least one additional device is communicatively coupled to the device via the wire pair.

32. The method of claim 31, further comprising performing auto media dependent interface crossover functionality when the wire pair is transposed with at least one additional wire pair.

33. The method of claim 32, further comprising performing the auto media dependent interface after determining whether the at least one additional device is communicatively coupled to the device via the wire pair.

34. The method of claim 31, further comprising performing auto power down when no device is communicatively coupled to the device via the wire pair.

35. The method of claim 34, wherein the auto power down comprises a partial auto power down.

36. The method of claim 31, further comprising waking up the device from a standby state after determining that the at least one additional device is communicatively coupled to the device via the wire pair.

37. The method of claim 31, further comprising employing a state machine to change an operational state of the device based on whether the at least one additional device is communicatively coupled to the device via the wire pair.

38. The method of claim 31, wherein at least one additional wire pair is communicatively coupled to the device; and further comprising summing energy on the wire pair and energy on the at least one additional wire pair.

39. The method of claim 38, wherein the wire pair comprises at least one of a transmit pair and a receive pair; and the at least one additional pair comprises at least one of a transmit pair and a receive pair.

* * * * *